(12) United States Patent  
Meng et al.

(10) Patent No.: US 8,463,044 B2  
(45) Date of Patent: Jun. 11, 2013

(54) METHOD AND DEVICE OF DETECTING OBJECT IN IMAGE AND SYSTEM INCLUDING THE DEVICE

(75) Inventors: Long Meng, Hai Dian District (CN); Weiguo Wu, Hai Dian District (CN)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 12/761,778

(22) Filed: Apr. 16, 2010

(65) Prior Publication Data

US 2010/0272366 A1  Oct. 28, 2010

(30) Foreign Application Priority Data

Apr. 24, 2009  (CN) .......................... 2009 1 0137371  
Sep. 25, 2009  (CN) .......................... 2009 1 0177755

(51) Int. Cl.
*G06K 9/46* (2006.01)
*G06K 9/62* (2006.01)

(52) U.S. Cl.
USPC ............................ 382/190; 382/205; 382/224

(58) Field of Classification Search
USPC .................................. 382/190, 195, 205, 224
See application file for complete search history.

(56) References Cited

U.S. PATENT DOCUMENTS

| 7,194,114 | B2 * | 3/2007 | Schneiderman | 382/118 |
| 2002/0102024 | A1 * | 8/2002 | Jones et al. | 382/225 |
| 2006/0088207 | A1 | 4/2006 | Schneiderman | |
| 2006/0204103 | A1 * | 9/2006 | Mita et al. | 382/190 |
| 2007/0297682 | A1 * | 12/2007 | Zhang et al. | 382/224 |
| 2011/0255743 | A1 * | 10/2011 | Guan et al. | 382/103 |

FOREIGN PATENT DOCUMENTS

CN  1731417 A  2/2006

* cited by examiner

*Primary Examiner* — Jon Chang
(74) *Attorney, Agent, or Firm* — Oblon, Spivak, McClelland, Maier & Neustadt, L.L.P.

(57) ABSTRACT

The present invention provides a method for detecting a specific object in an image to be detected, including: a feature extraction step for extracting an image feature of the image to be detected; and a detection step for detecting detection windows with various sizes of the image to be detected according to the extracted image feature by using classifiers with various sizes corresponding to at least a part of the detection windows with various sizes, so as to determine the presence and location of a specific object in the image to be detected. The invention further provides an object detection device and a system including the device. The method, device and system for detecting a specific object in an image to be detected can improve the precision and increase the speed of the object detection.

25 Claims, 7 Drawing Sheets

| 36*72 | 40*80 | 44*88 | 48*96 | 52*104 | 56*112 | 64*128 |
|---|---|---|---|---|---|---|
| | | | | | | |

(A)

| | | | | 28*56 | 32*64 | 36*72 |
|---|---|---|---|---|---|---|
| 40*80 | 44*88 | 48*96 | 52*104 | 56*112 | 64*128 | 72*144 |
| 80*160 | 88*176 | 96*192 | 104*208 | 112*224 | | |

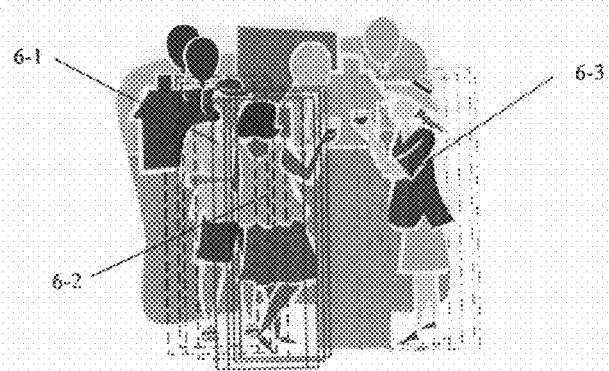
Fig. 6A
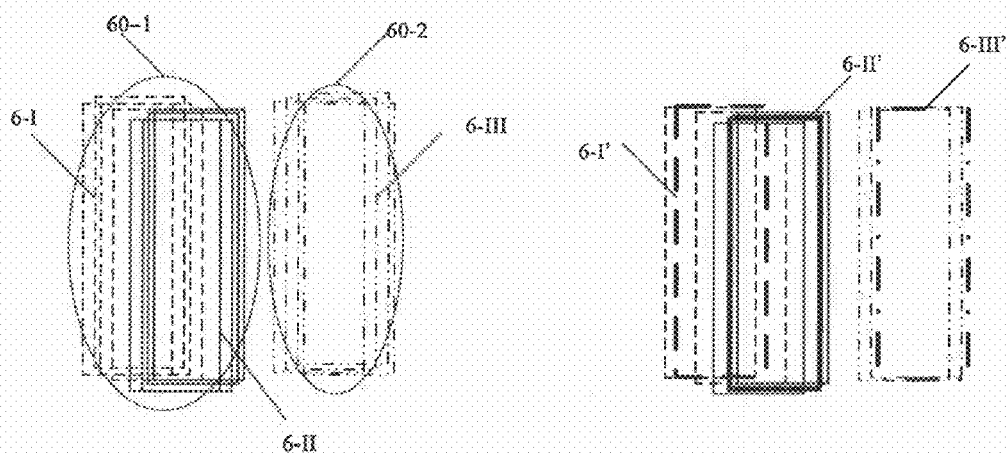
Fig. 6B
Fig. 6C

METHOD AND DEVICE OF DETECTING OBJECT IN IMAGE AND SYSTEM INCLUDING THE DEVICE

The present application claims priorities of Chinese Patent Applications No. 200910137371.3, titled "Method and apparatus for detecting an object in an image, and system containing the apparatus", filed on Apr. 24, 2009; No. 200910177755.8, titled "Method and apparatus for detecting an object in an image, and system containing the apparatus", filed on Sep. 25, 2009, the whole contents of which are incorporated herein by reference.

FIELD OF THE INVENTION

The present invention generally relates to the field of image processing, and particularly to a method and device for detecting a specific object in an image and a system including the device.

BACKGROUND OF THE INVENTION

Images can generally be divided into a static image and dynamic video images. In one of two general categories of methods to detect a target (i.e., a specific object) in the dynamic video images or a static image, a classifier distinguishing a target from a background is created from a feature of the static image and used to detect an object or target in the image. With respect to the dynamic video images, each frame of image among the dynamic video images is regarded as a static image for detection. In the other category of methods, a specific object in the video image is detected by combining the static features of the images with information on correlation between frames, motion, voice, etc., of the video image. The foregoing former method is a basis for detecting the specific object in the image.

In Viola P, Jones M J, "Rapid Object Detection Using a Boosted Cascade of Simple Features", Proc. of International Conference on Computer Vision and Pattern Recognition, 2001, 1:511-518 (herein after referred to as reference document 1), a target in a static image is detected using Haar-like rectangular features, and a boost approach is used to select automatically the feature(s) for use.

In Viola P, Jones M J, Snow D, "Detecting pedestrian using patterns of motion and appearance", Computer Vision, 2003.734-741 (herein after referred to as reference document 2), Viola suggests that motion of a pedestrian in video has unique characteristics, and a feature regarding oriented amplitude of the motion can be extracted from a differential image between frames and a variation of the differential image and trained together with a static feature to derive a classifier. This method, however, can not be applied to a moving lens.

In Lienhart R, Maydt J., "An extended set of Haar-like features for rapid object detection", IEEE ICIP, 2002 (hereinafter referred to as reference document 3), the rectangle features of a static image are extended by adding features including a polygon feature declining at an angle of 45 degrees, etc., and both the Haar-like feature and the rectangular feature are the sum of features of all pixels in a rectangular block without taking into account the distribution of the features in the block.

In N. Dalal, B. Triggs, "Histograms of Oriented Gradients for Human Detection", Proc. of IEEE Computer Society Conference on Computer Vision and Pattern Recognition, 2005: 886-893 (hereinafter referred to as document 4), a pedestrian in an image is detected using Histograms of Oriented Gradients (HOG) features by calculating gradients at respective locations of a target, summing the calculated oriented gradients, taking a ratio of the sums of the gradients between areas as a feature and using a Support Vector Machine (SVM) for training. The target varying in a small range and with a small angle can be accommodated due to the statistical properties of the histogram.

In N. Dalal, B. Triggs, and C. Schmid, "Human Detection Using Oriented Histograms of Flow and Appearance", Proc. European Conference on Computer Vision, 2006 (hereinafter referred to as document 5), Oriented Histograms features are taken from an optical flow field of video to extract a motion feature of a pedestrian, and the Oriented Histograms features are used for detection in combination with static Histograms of Oriented Gradients features. The Histograms of Oriented Gradients features are also features based on the rectangular blocks, and are obtained by summing the features in the block and calculating a ratio of the allocation ratios of the features allocated among blocks without taking into account the distribution of the features in the block.

In Qiang Zhu, Shai Avidan, Mei-Chen Yeh, Kwang-Ting Cheng, "Fast Human Detection Using a Cascade of Histograms of Oriented Gradients", Proc. IEEE Conf. Computer Vision and Pattern Recognition, vol. 2, pp. 1491-1498, 2006 (hereinafter referred to as document 6), a method is proposed for rapid detection using HOG features with varying sizes. This method calculates firstly integral images of respective oriented gradients and then calculates simplified HOG features from the integral images. This method changes the size of the feature instead that of an image to detect persons with different sizes. Such a practice equivalently modifies a classifier and thus causes a loss of performance. Moreover, this detection method operates at the QVGA in approximately 200 ms, which means that it is not real time. Incidentally, the OVGA stands for a fixed resolution with Q for Quarter and OVGA for a quarter in size of the VGA, that is, a display is presented on a screen at a resolution of 240×320 pixels.

Moreover, no classifier has perfect performance, and there are possibilities that an improper response indicating detection of an object is made at a location where the object is absent or a plurality of detection responses are made around an object, and thus, a post-processing method for removing the improper response and combining the repeated responses is required. In an existing object detection method, it is typical to determine an overlapping extent of a series of detection windows resulting from the processing by a classifier. Then, these detection windows are post-processed according to the determined overlapping extent of the detection windows to determine the presence and location of a specific object in an image to be detected. Specifically, if an overlapping extent between two detection windows is less than a determined threshold value, then both of the detection windows are determined to be related to the same specific object and then combined into a detection window related to the specific object. However, this method suffers from low precision of processing. Moreover, this method does not work well in the case that specific objects in the image to be detected overlap partially, because detection windows corresponding to the different specific objects may be determined as those related to the same specific object and combined so that the specific objects overlapping partially can not be distinguished accurately. In Navneet Dalal, "Finding people in images and videos" published as his doctor thesis in July, 2006, a mean-shift based post-processing method was proposed. This method performs the post-processing mainly through a typical peak search approach, but it still fails to distinguish satisfactorily objects (persons) in proximity or even overlapping partially and suffers from a complex process and a heavy processing load on the system.

SUMMARY OF THE INVENTION

In view of the foregoing circumstances in the prior art, an object of the invention is to provide a method for detecting a specific object in an image, and other objects are to provide a device and system for detecting a specific object in an image. One advantageous effect brought about by the method, device and system for detecting a specific object in an image according to the invention lies in improving the precision of detecting the object, and another advantageous effect involves increasing the speed of detecting the object to facilitate real time detection.

According to an embodiment of the invention, a method for detecting a specific object in an image includes: a feature extraction step for extracting an image feature of the image to be detected; and a detection step for detecting detection windows with various sizes of the image to be detected according to the extracted image feature by using classifiers with various sizes corresponding to at least a part of the detection windows with various sizes, so as to determine the presence and location of a specific object in the image to be detected.

According to an embodiment of the invention, a device for detecting a specific object in an image to be detected, comprising: a feature extraction unit configured to extract an image feature of the image to be detected; and a detection unit configured to detect detection windows with various sizes of the image to be detected according to the extracted image feature by using classifiers with various sizes corresponding to at least a part of the detection windows with various sizes, so as to determine the presence and location of a specific object in the image to be detected.

As can be seen from the above, the method and device for detecting a specific object in an image according to the invention can be used to detect the detection windows with various sizes using the classifiers with corresponding sizes during detection of the specific object in the image. Since at least a part of the detection windows with various sizes can be detected using the classifiers with corresponding sizes, precision of object detection can be improved.

Moreover, the method and device for detecting a specific object in an image according to the invention can be used to create a set of image features by extracting image features of at least a part of cells in the image to be detected in advance so that at least a part of the image features of the detection windows with various sizes can be retrieved directly from the image features of these cells in the set of image features during detection using a classifier without feature extraction process, thereby improving the speed of object detection and facilitating real time object detection.

BRIEF DESCRIPTION OF THE DRAWINGS

The foregoing and other objects, features and advantages of the invention will become apparent from the following descriptions of embodiments of the invention in connection with the drawings throughout which identical or similar reference numerals denote identical or similar functional components or steps and in which:

FIG. 3A and FIG. 3B are schematic diagrams illustrating an explanatory example of a process of obtaining classifiers with various sizes by transformation in the object detection method according to the embodiment of the invention as illustrated in FIG. 1;

FIG. 6A to FIG. 6C are schematic diagrams illustrating an explanatory example of a process of determining a specific object and the location thereof in an image to be detected by performing post-processing on detection windows output from classifiers in the detection step of the object detection method illustrated in FIG. 1.

DETAILED DESCRIPTION OF THE INVENTION

Figure 1:
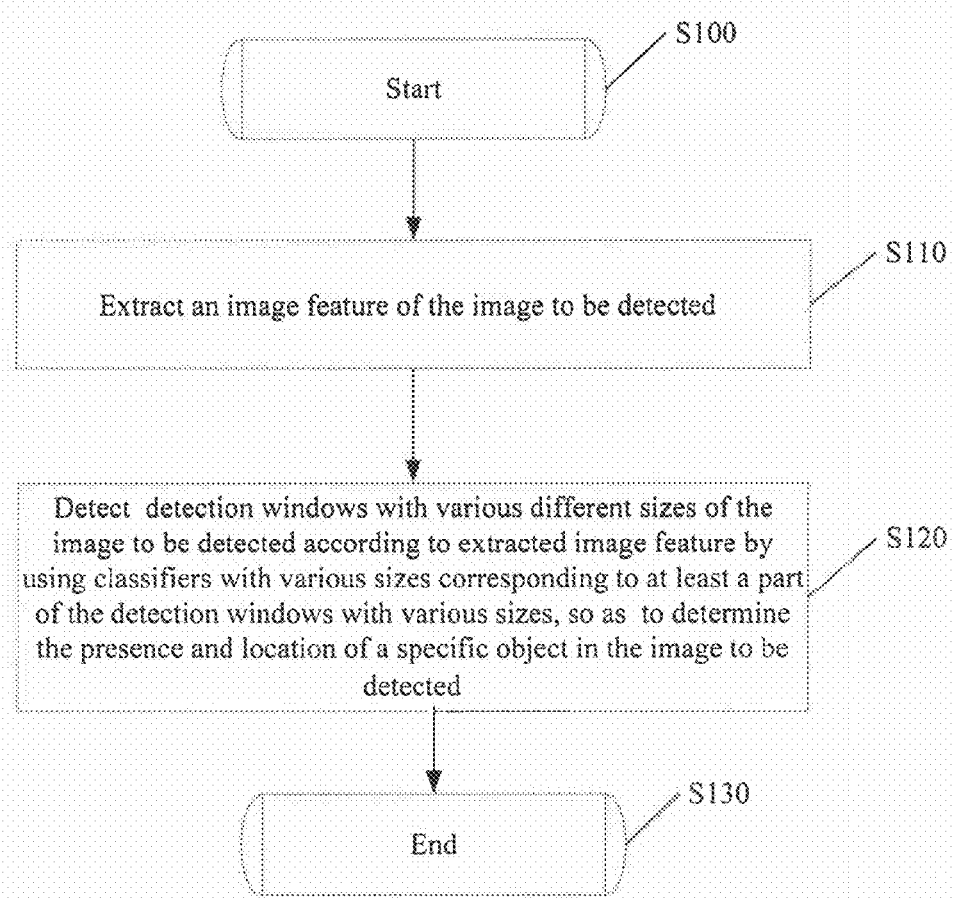
FIG. 1 is a schematic flow chart illustrating a method for detecting a specific object in an image to be detected according to an embodiment of the invention.

Embodiments of the invention will be described below with reference to the drawings. It shall be noted that illustration and description of components and processes irrelevant to the invention and known to those ordinarily skilled in the art will be omitted in the drawings and the description for clarity.

A method for detecting a specific object in an image to be detected according to an embodiment of the invention will be detailed below with reference to FIG. 1 to FIG. 3.

Firstly, a general flow of the conventional image processing method for detecting a specific object in an image to be detected (a static image or dynamic video images) will be described briefly to facilitate understanding of the technical solution of the invention to be described below. Detection of a specific object in a static image will be described as an example. For detection of the object, the entire image is scanned using a plurality of detection windows with a certain specific size, for example, from the top left corner to the top right corner of the image. The detection windows slide at a step and therefore overlap with each other to an extent determined by a scan density, i.e., the size of the step. Characteristics of each of the detection windows include the location thereof in the image to be detected and the aspect ratio (or size or scale) thereof. Typically, the size of the detection window is changed and the foregoing scan is repeated on the entire image to be detected using the detection window with the changed size. Such processes of changing and scanning will generally be repeated several times. Corresponding image features are extracted respectively for the detection windows with various sizes, and the extracted image features of the detection windows are detected using a pre-trained comparator to thereby determine the presence and location of the specific object in the image to be detected by performing classification and determination on the detection windows with various sizes.

A process of performing classification and determination on the detection windows resulting from the image to be detected using a classifier refers to a process in which the classifier performs classification and determination to select one of the detection windows the most probable to represent the presence of the object and the probability of the selected one detection window, with the probability indicating the extent the selected one detection window represents the object. For example, a boosting cascade classifier can be created from training. The detection windows pass successively through serial stages of the classifier, so that the majority of background windows are precluded at the first several stages of the classifier, and those of the detection windows including the object enter the last stage. The classifier outputs the sizes and locations of these detection windows in the image to be detected and the probabilities thereof of representing the object. A general principal of performing classification and determination using a classifier and general operations thereof are not of interest to the invention, and relevant knowledge thereof can be available from the reference documents cited as above for example, and therefore repeated descriptions thereof will be omitted here.

Figure 2:
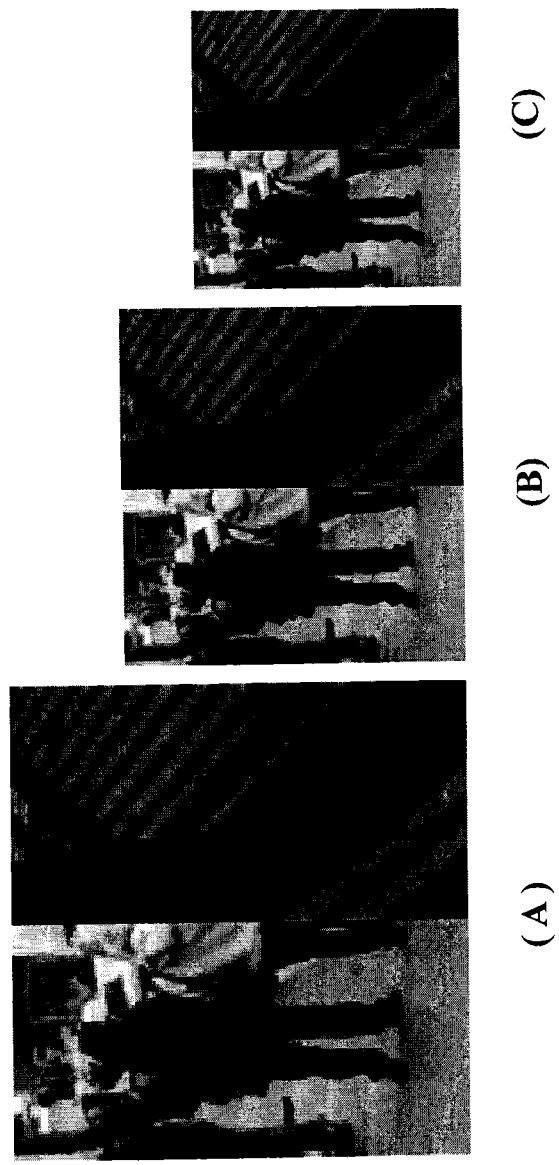
FIG. 2A to FIG. 2C are schematic diagrams illustrating a library of sample images with various sizes in classifiers with various sizes in the object detection method according to the embodiment illustrated in FIG. 1.

FIG. 1 is a schematic flow chart illustrating a method for detecting a specific object in an image to be detected according to an embodiment of the invention. As illustrated, the method starts with the step S100. An image feature of the image to be detected is extracted in the feature extraction step S110. In the detection step S120, detection windows with various sizes of the image to be detected are detected according to the extracted image feature by using classifiers with various sizes corresponding to at least a part of the detection windows with various sizes, so as to determine the presence and location of a specific object in the image to be detected. As can be seen from the brief description of the foregoing general flow of detecting an object in an image to be detected, a process of detecting detection windows of an image to be detected using a classifier is implemented by performing classification and determination on the detection windows.

In an existing method for detecting a specific object in an image, when the image is detected using a pre-trained classifier to identify the specific object, e.g., a person, in the image, only the classifier with a certain fixed size is used to perform classification and determination on detection windows with various sizes to detect the presence and location of the specific object in the image. However, extraction of a feature from the image to be detected involves detection windows with various sizes or scales, so the classifier with the fixed size can only correspond to the detection windows with a specific size. When the classifier with that size is used to perform detection or classification and determination on the detection windows with another size, the size of the image in the detection windows or of the classifier has to be adjusted for match in size with each other to subsequently perform classification and determination. However, such adjusting equivalently changes the size of the image features or modifies the classifier, and thus leads to a loss of detection performance and a reduction in precision of detecting the object.

Classifiers with various sizes are used for detection in the object detection method as illustrated in FIG. 1 according to the invention. Specifically, in the case of scanning the entire area of the image to be detected using at least one detection window with a first size, for example, the detection windows with the first size are subjected to classification and determination based on extracted image features corresponding to the detection windows with the first size using a classifier with the first size among the classifiers with various sizes, and the classifier with the first size corresponds in size to the detection windows with the first size. Next, the image to be detected is scanned using at least one detection window with a second size, and the detection windows with the second size are subjected to classification and determination using one of the classifiers with the second size corresponding in size to the detection windows with the second size, and so on. Detection windows with a specific size among the detection windows with various sizes can be subjected to classification and determination using the classifier with the size corresponding to that certain size among the classifiers with various sizes. With this method, the classifiers with matched sizes can be selected for performing classification and determination on the detection windows with various sizes without adjusting the size of the image in the detection window and/or the size of the classifier, so neither the features of the image nor performance of the classifier will be changed, thus improving precision of detecting the object.

In an explanatory example of the object detection method according to the embodiment of the invention, each classifier with a specific size among the classifiers with various sizes is provided with a library of sample images with a size corresponding to the specific size, and the respective libraries of sample images match in size with the detection windows with corresponding sizes to be subjected to classification and determination by the classifiers with corresponding sizes. FIG. 2A to FIG. 2C respectively illustrates schematic diagrams of libraries of sample images with three different sizes for classifiers with three different sizes. For example, libraries of sample images with first, second and third sizes as illustrated in FIG. 2A to FIG. 2C match in size respectively with the detection windows with the first, second and third sizes of the image to be detected. Of course, this figure is merely illustrative, and classifiers with a number i of different sizes can be provided as needed, and correspondingly libraries of sample images with a number i of different sizes can be available, where i is a natural number equal to or larger than 2.

As can be appreciated by those skilled in the art, classifiers with various sizes can be derived in various ways. By way of an example without limitation, classifiers with various sizes can be obtained by pre-training libraries of sample images with various sizes.

A specific process of training a library of sample images with a specific size to obtain a classifier with a corresponding size can be implemented in various existing methods. For example, for a library of sample images with a specific size, several features which best distinguish a target from a background among extracted image features are selected as a set of active features, weak classifiers corresponding to features or combinations of features in the set of active features are trained, and weights are appropriately assigned to the respective weak classifiers to get a resultant combined classifier, for example, in a boosting method. Alternatively, the set of active features can be trained collectively to obtain a classifier, for example, a classifier can be trained in a machine learning method, e.g., Support Vector Machine (SVM). How to train a classifier is not of interest to the invention, and therefore repeated descriptions thereof will be omitted here.

In an explanatory example of the object detection method according to the embodiment of the invention as illustrated in FIG. 1, the classifiers with various sizes may correspond in size fully or partially to the detection windows with various sizes used in the detection step S120 of performing classification and determination using the classifiers.

Full corresponding as mentioned above means that the respective classifiers with matched sizes among the classifiers with various sizes can be found for the respective detection windows with various sizes used in the detection step S120. In this case, for the detection windows with a specific size, one classifier corresponding in size to (i.e., matching in size with) the detection windows among the classifiers with various sizes is used for classification and determination in the detection step S120.

Partial corresponding as mentioned above means that no classifier with a matched size among the classifiers with various sizes can be found for the detection windows with some sizes used in the detection step S120. In this case, for detection windows for which any classifier with a corresponding size can be found, the classifier with the corresponding size is used for performing classification and determination on the detection windows in the detection step S120. For detection windows for which no classifier with a corresponding size among the classifiers with various sizes can be found, the sizes of the images in the detection windows are adjusted and/or the size of a classifier with a specific size among the classifiers with various sizes is adjusted for achieving the match between the detection windows and the classifier detecting the detection windows, thereby making it possible to perform classification and determination by the classifier.

In an explanatory example of the object detection method according to the embodiment of the invention as illustrated in FIG. 1, a process of performing transformation on a classifier with a specific size among the classifiers with various sizes may also be carried out to obtain classifiers with other different sizes than that of the classifiers with various sizes. Such transformation may include doubling or segmentation, for example.

FIG. 3A and FIG. 3B illustrate schematic diagrams of an explanatory example of classifiers with corresponding sizes obtained through such transformation, taking the QVGA as an example in which a specific object to be detected is a person. FIG. 3A illustrates existing full-length classifiers with various sizes. For example, the parameter "36*72" for the classifier with a specific size means that an image in a library of sample images for the classifier with that specific size has a width of 36 pixels and a height of 72 pixels. The corresponding parameters of these classifiers as illustrated in the table of FIG. 3A can be multiplied by 2 to obtain classifiers with other sizes as illustrated in the table of FIG. 3B. For example, a classifier with a size of "36*27" in FIG. 3A can be transformed by being multiplied by 2 into a classifier with another size of "72*144" in FIG. 3B, and a classifier with a size of "40*80" in FIG. 3A can be transformed by being multiplied by 2 to obtain a classifier with another size of "80*160" in FIG. 3B, etc. Similarly, the corresponding parameters of these classifiers as illustrated in the table of FIG. 3A can be divided by 2 to obtain classifiers with other sizes as illustrated in the table of FIG. 3B. For example, a classifier with a size of "56*112" in FIG. 3A can be transformed by being divided by 2 to obtain a classifier with another size of "28*56" in FIG. 3B, and classifier with a size of "64*128" in FIG. 3A can be transformed by being divided by 2 to obtain a classifier with another size of "32*64" in FIG. 3B, etc. As can be seen from the above, such transformation process is similar to doubling or segmentation. Through such transformation process, some classifiers with specific sizes can be obtained by performing simple mathematical operations on the existing classifiers with various sizes.

Of course, those skilled in the art would appreciate that any other appropriate types of transformations can be utilized in addition to the foregoing transformation.

This process of performing transformation on the existing classifiers with various sizes to obtain classifiers with other sizes can be carried out prior to the image feature extraction step S110 of the object detection method as illustrated in FIG. 1, between the image feature extraction step S110 and the detection step S120 or concurrently with the image feature extraction step S110 or the detection step S120.

In the object detection method in the embodiment according to the invention as illustrated in FIG. 1, classification and determination are respectively performed on the detection windows with various sizes by the classifiers with corresponding sizes. If a result of the comparison and determination related to a classifier with a size shows the presence of the object with a size corresponding to that of the classifier at a certain location, then the location and size and the probability representing the presence of the object are recorded to derive a probabilistic distribution of location and size of the object in the image. The foregoing process is performed for each of the classifiers with various sizes to derive probabilistic distributions of location and size of the object corresponding to the classifiers with various sizes. Particularly, the closely located and similarly sized detection windows determined to have a probability of the presence of the object above a predetermined threshold may represent the same object and therefore can be combined subsequently to get a final result, as will be detailed later.

In the object detection method in the embodiment according to the invention as illustrated in FIG. 1, the image to be detected may be a static image or dynamic video images. In the case that the image to be detected is dynamic video images, each frame of image in the dynamic video images can be regarded as a static image, and this static image is subjected to object detection using the classifiers with various sizes. In an alternative, preceding and succeeding frames of images among the dynamic video images are correlated to some extent, and thus, for a certain frame of image among the dynamic video images, detection results of other corresponding frames of images among the video images can be adjusted correspondingly according to the correlation between the certain frame of image and the other frames of images to derive a detection result of the certain frame of image.

In the object detection method in the embodiment according to the invention illustrated in FIG. 1, the classifiers with various sizes can be used for classification and determination on the detection windows with corresponding sizes to thereby improve precision of object detection. Experimental data shows that the method according to the embodiment of the invention can improve the precision of object detection by approximately 10% over a similar method in the prior art.

As can be apparent from the brief description of the foregoing general flow of the conventional image processing method for detecting a specific object in an image to be detected (a static image or dynamic video images), all the image features have to be extracted in real time during detection in an existing process of detecting a specific object, and the extraction of a large number of features may impose a large calculation load on the system. Moreover, a significant part of the extracted image features may be repetitive due to an overlapping relationship of the detection windows, and this may cause a large amount of repeated calculations to be performed during detection and consequently hinder real time object detection. For example, in the method mentioned in the foregoing reference document 6, it still takes approximately 200 ms to operate at the QVGA, which means that object detection is not real time, despite the use of rapid calculation of the simplified HOG features from the integral images.

In an example of the object detection method according to the embodiment of the invention in FIG. 1, image features of at least a part of all the cells with various sizes of the image to be detected related to the detection windows with various sizes can be generated in advance in the feature extraction step S110 to thereby create a set of image features of the image to be detected, so that at least a part of the image features of the detection windows with various sizes can be retrieved from the set of image features. Particularly, the set of image features includes values of the image features of the at least a part of the cells and the locations of these cells throughout the image to be detected. As can be apparent, in the present example, the set of image features includes the image features of the cells related to the areas covered by the detection windows with various sizes, so the image features of corresponding detection windows can be derived through simple processing on the feature images of these cells in the set of image features, as will be detailed later. That is, at least a part of the image features of the detection windows with various sizes will not necessarily be extracted in real time during object detection, thereby facilitating real time object detection.

Firstly a general principal of an image feature and extraction thereof will be described briefly prior to further detailing of the present example.

As well known, an image to be detected is divided into several arbitrary areas during the detection of a specific object in the image, and related image features are extracted with respect to these arbitrary areas and include but will not be limited to:

Various image features in the respective areas, for example:
A statistic feature of mean, variance, covariance, etc., of brightness, gradient, high-order gradient, color, edge, etc.;
A response of brightness, gradient, high-order gradient, color, edge, etc., to various filters;
A linear or nonlinear combination of features of several smaller areas, etc.

Distribution features of image feature points in the respective areas, for example:
A distribution of brightness, gradient, high-order gradient, color, edge, etc. in the areas;
A distribution of oriented gradient, high-order gradient, etc.;
A joint distribution of oriented gradient, high-order gradient, etc., in the respective areas, etc.

The embodiment according to the invention as illustrated in FIG. 1 is described taking a HOG feature of related brightness of the image to be detected as an example. The HOG feature will be described briefly below.

Figure 4:
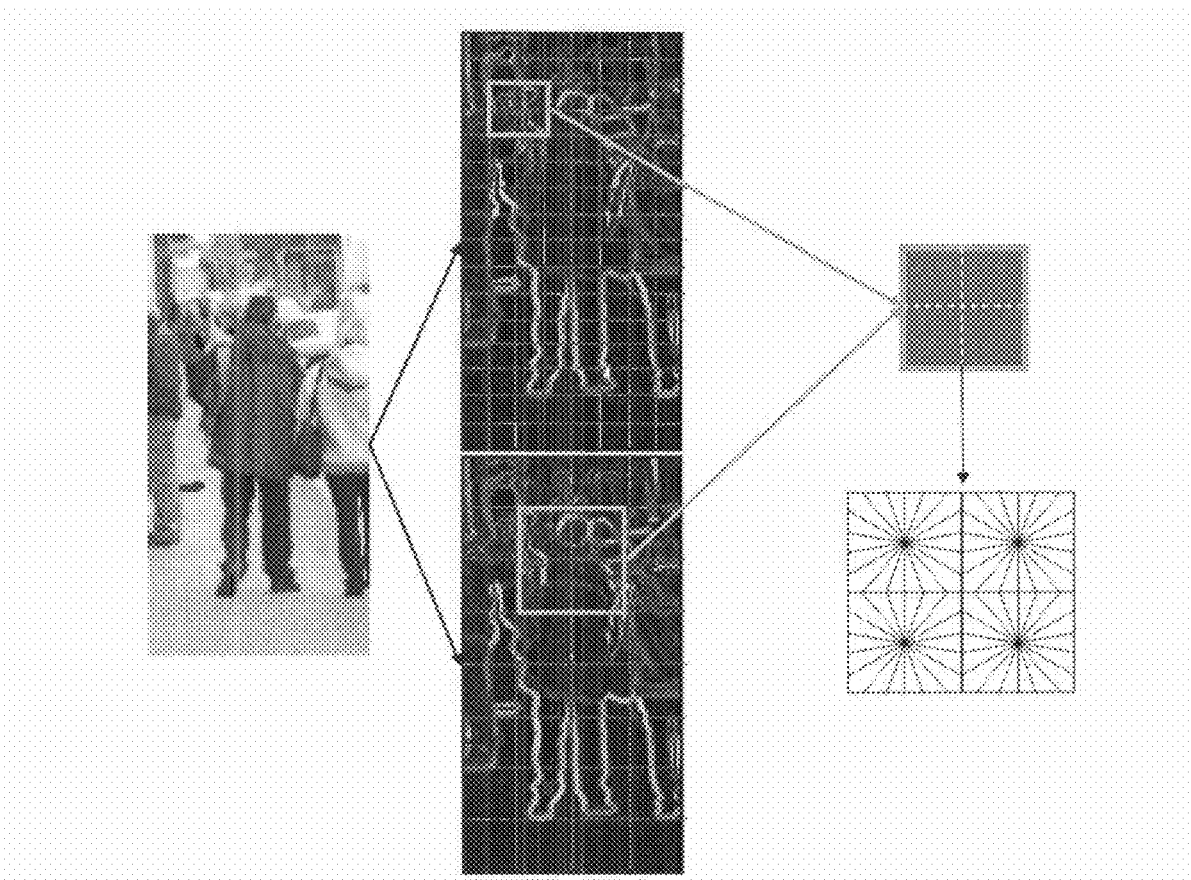
FIG. 4A to FIG. 4C are schematic diagrams illustrating a process of extracting a HOG feature from an image.

FIG. 4A to FIG. 4C are schematic diagrams illustrating a process of extracting HOG features with various sizes in the image, where FIG. 4A illustrates the original image from which a HOG feature is to be extracted, FIG. 4B illustrates division of the original image into blocks with various sizes, i.e., cells with arbitrary sizes, on a gradient plot, and FIG. 4C illustrates a resultant HOG feature. As illustrated in FIG. 4A to FIG. 4C, the image from which an image feature is to be extracted is divided into several blocks, the gradient plot is divided in several directions, respective oriented gradients of all the pixels in each of the blocks are summed, every adjacent four blocks are combined into a larger block, and the sums of the respective oriented gradients are normalized to derive a HOG feature of the corresponding larger block.

Specifically, for a block with a specific size in the original image:
Brightness of the image is I(x, y), where x and y represents position coordinates in the original image,
The horizontal gradient is expressed as $I_x(x,y)=d(I(x,y))/dx=I(x+1,y)-I(x-1,y)$,
The vertical gradient is expressed as $I_y(x,y)=d(I(x,y))/dy=I(x,y+1)-I(x,y-1)$,
The magnitude of the gradient is expressed as $Grad(x,y)=\sqrt{I_x^2+I_y^2}$, and The orientation of the gradient is expressed as $\theta(x,y)=\arg tg(|I_y/I_x|)$.

Of course, the various details involved in the foregoing extraction of a HOG feature in FIG. 4A to FIG. 4C can be modified by those skilled in the art as needed in practice. Moreover, any other image feature based upon an area can alternatively be used. For example, differentials of three color components of each pixel may be calculated with respect to x, y, and the maximum one of the differentials can be used as the gradient of the pixel. It shall be noted that the details of a HOG feature and extraction thereof are not of interest to the invention, and the HOG feature can be extracted in various methods and thus repeated descriptions thereof will be omitted here. For example, reference document 4 describes the HOG feature in detail.

In an explanatory example of creating a set of image features in the present preferred embodiment, cells with at least one specific size throughout the image to be detected related to the detection windows with various sizes can be selected as basic cells, and image features of the basic cells can be extracted. Then, image features of respective cells larger in size than the basic cells can be obtained to thereby create a set of image features of the image to be detected. Thus, the image features of a cell with a larger size in the set of image features can be derived by combining the image features of cells with a smaller size, as will be described later, without extracting the features of the cell with larger size during detection, thus improving the speed of object detection and facilitating real time object detection.

In an explanatory example of creating a set of image features, image features corresponding to overlapping areas between the differently located and sized detection windows in the image to be detected can be included in the set of image features, and then the image features can be shared between these detection windows to the maximum extent without repeated calculations of the image features, thereby improving the speed of object detection.

Figure 5:
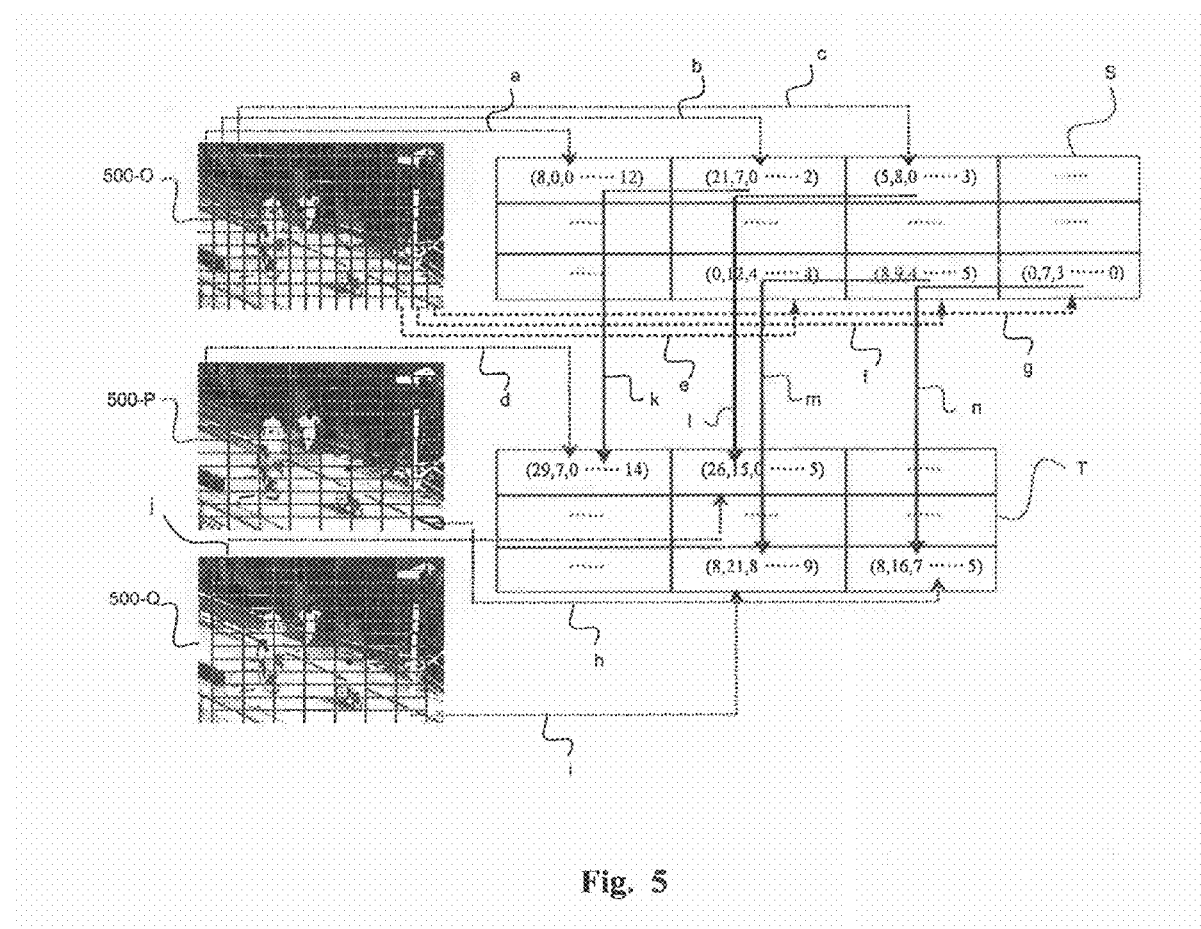
FIG. 5 is a schematic diagram illustrating a process of extracting a set of image features in the feature extraction step of the object detection method in the embodiment illustrated in FIG. 1.

FIG. 5 is a schematic diagram illustrating an example of creating a set of image features. As illustrated in FIG. 5, in the process of the feature extraction step S110 of the object detection method as illustrated in FIG. 1, the image to be detected 500 is divided into basic cells with a specific size, and HOG features of the respective basic cells are calculated. The image features of a cell whose size is an integer multiple of the size of the basic cells can be derived by performing addition on the HOG features of several basic cells. The sum of the HOG features of several adjacent basic cells subjected to addition is normalized to derive a resultant HOG feature of the cell whose size is an integer multiple of the size of the basic cells. The HOG features of all the basic cells and of the respective larger cells derived by performing direct addition on the HOG features of the respective basic cells together constitute a set of image features of the image to be detected 500. It shall be noted that it may not always be the case that the image features of a larger cell are derived by normalizing the sum of the HOG features of several adjacent basic cells. For example, no normalization is required for the feature of brightness of the image. Those skilled in the art can determine whether normalization is required in view of a specific image feature used during object detection.

Images 500-O, 500-P and 500-Q in FIG. 5 illustrate respectively division of the image to be detected 500 into cells with different sizes. As illustrated in 500-O in FIG. 5, the image to be detected 500 is divided into a plurality of basic cells with a size of 4*4 pixels. S and T in FIG. 5 represent respective parts of the set of image features, hereinafter referred to as a set of image features S and a set of image features T. As illustrated, the set of HOG features includes the HOG features of the respective basic cells, where bracketed digits represent the values of respective HOG features which are vectors. For example, respective parts indicated by lines a, b and c in the set of image features S show the image features of the first, second and third basic cells on the top left of the image 500-O to be detected, and respective parts indicated by lines g, f and e in the set of image features S show the image features of the first, second and third basic cells on the top right of the image 500-O to be detected.

The image 500-P in FIG. 5 illustrates division of the image 500 to be detected into a plurality of cells with a size of 8*4 pixels for feature extraction. Since the size of the first cell on the top left corner of the image 500 to be detected is an integer multiple (twice here) of that of the basic cell illustrated in the image 500-0, the image features of the first and second basic cells on the top left corner of the image 500-0 to be detected are subjected to simple addition (as indicated by the line k) to derive the image feature of the first cell on the top left corner in the image 500-P, and the part in the set of image features T indicated by the line d shows the image feature of the first cell on the top left corner. Similarly, the image features of the first and second basic cells on the bottom right corner of the image 500-0 to be detected are subjected to simple addition (as indicated by the line n) to derive the image feature of the first cell on the bottom right corner in the image 500-P, and the part in the set of image features T indicated by the line h shows the image feature of the first cell on the bottom right corner of the image 500-P.

If the image 500 to be detected is divided into a plurality of cells with a size of 8*4 pixels as in 500-Q of FIG. 5 for feature extraction, then the image features of the second and third basic cells on the top left corner of the image 500-O to be detected are subjected to simple addition (as indicated by the line l) to derive the image feature of the first cell on the top left corner in the image 500-P, and the part in the set of image features T indicated by the line j shows the image feature of the first cell on the top left corner. Similarly, the image features of the second and third basic cells on the bottom right corner of the image 500-O to be detected are subjected to simple addition (as indicated by the line m) to derive the image feature of the first cell on the bottom right corner in the image 500-P, and the part in the set of image features T indicated by the line i points shows the image feature of the first cell on the bottom right corner in the image 500-Q.

Those skilled in the art would appreciate that, as long as the size of a cell into which the image 500 to be detected is divided for feature extraction is an integer multiple of the size of the basic cells in the image 500-O, the image features of the cell can be derived through a simple operation of the image features of the basic cells in 500-O, for example, through several times of simple additions of the image features of several basic cells. This addition operation can be referred to as a simple addition operation. For example, there is also another case (not illustrated in FIG. 5) in which the size of the cell into which the image 500 to be detected is divided is more than twice (e.g., four times) that of the basic cells, then the image features of the basic cells are firstly subjected to simple addition to derive the image features of the larger first cells whose size is twice that of the basic cells, and then the image features of the derived first cells are subjected to simple addition to derive the image features of the second cells whose size is four times that of the basic cells. In another example, the image features of the larger first cells whose size is three times that of the basic cells can firstly be derived, and then the image features of the derived first cells can be subjected to simple addition to derive the image features of the second cells whose size is six times that of the basic cells, and so on. Such addition operation performed in an iterative way results in the image features of a cell whose size is as any integer multiple of the size of the basic cells and can be referred to as an "iterative" addition operation. Those skilled in the art would appreciate that, the foregoing simple addition operation and iterative addition operation can also be combined to derive the image feature of a cell whose size is any integer multiple of the size of the basic cells from the image features of the basic cells.

Moreover, although the set of image features is created based upon basic cells with one specific size in the foregoing example, those skilled in the art would appreciate that basic cells with various sizes can also be set and the image features of cells whose size is integer multiples of the sizes of these basic cells can be derived respectively to thereby create the set of image features.

The foregoing addition of the image features can be regarded as an "image splicing" process of splicing respective cells into which the image to be detected 500 is divided. Those skilled in the art would appreciate that the image features of a cell whose size is any integer multiple of the size of the basic cells can be derived from the image features of the basic cells in any other appropriate calculation method. For example, the values of the image features of the basic cells can be multiplied to thereby derive the image features of another cell with a corresponding size. Moreover, the size of the basic cells can alternatively be any other size than 4*4 pixels illustrated in the image 500-O of FIG. 5. The foregoing specific parameters related to creation of a set of image features can be set specifically as needed in practice, and therefore repeated descriptions thereof will be omitted here.

A set of image features is consisted of the derived image features of all the cells with various sizes, and S and T in FIG. 5 can be respective constituent parts of the set of image features, for example. The set of image features includes the image features of cells with corresponding sizes in the image to be detected and the locations of the respective cells in the image to be detected. In the example illustrated in FIG. 5, the set of image features is in the form of a lookup table. However, those skilled in the art would appreciate that the set of image features is actually a database embodying the image features of the cells in the image to be detected and the locations of the respective cells in the image to be detected and therefore can alternatively be a database in any other form, e.g., a data link table.

In an example, the set of image features to be created is in the same form as that of a library of image features used to train a classifier. That is, the type and number of image features included in the set of image features are made correspond fully to those of image features in a library of image features of a set of training images used to train the classifier in advance. Thus, when the image to be detected is subjected to object detection, all the image features to be detected by the classifier can be retrieved directly from the set of image features without real time extraction of the image features from respective cells in the image, thereby improving significantly the speed of object detection. Alternatively, the type and number of image features included in the set of image features can be made not fully correspond to those of image features in the library of image features of the set of training images used to train the classifier in advance. For example, the set of image features can be constituted of the image features of only a part of cells, e.g., basic cells, and the image features of cells with other sizes can be derived through a simple operation on the image features of corresponding cells in the set of image features during object detection or extracted in real time from these cells with other sizes.

In an alternative, the image features of all the cells throughout the image to be detected can be calculated to create the set of image features. Of course, the image features of only at least a part of areas involved in overlapping parts of the respective detection windows can be calculated to create the set of image features.

As described above, the image features of at least a part of the cells in the image to be detected need not to be extracted in real time during detection by using a classifier, thereby improving the speed of object detection and facilitating real time object detection. Moreover, if the set of image features includes the image features of at least a part of areas involved in the overlapping parts of the respective detection windows, then the speed of object detection can be improved because a large amount of repeated calculations of the image features are dispensed with.

For the image feature of a cell absent in the set of image features, the image feature can be extracted in real time from the cell during object detection. Such a process of extracting in real time the image feature can be implemented in various existing approaches, and therefore repeated descriptions thereof will be omitted here.

In another alternative, the image features extracted in real time can be stored into and thus update the set of image features. If the updated part includes the image features of cells corresponding to the overlapping parts of the detection windows, then the image features of these overlapping parts can be retrieved directly from the updated set of image features during subsequent detection to dispense with repeated real time calculation for extraction, thereby increasing the speed of the object detection.

A comparative test shows that the method according to the present example of the invention can operate at the QVGA in only approximately 50 ms to thereby facilitate real time object detection in the image to be detected.

It shall be noted that the image to be detected involved in the foregoing embodiments may be a static image or dynamic video images. For the dynamic video images, each frame of image among the video images can be regarded as a static image, and a corresponding set of image features can be created in the foregoing method according to the present example. Alternatively, for a certain frame of image among the video images, some features in a set of image features of a frame of image preceding the certain frame of image can be updated according to motion information, correlation between frames, etc., of the video images to create a set of image features of the certain frame of image.

As can be seen from the foregoing description of the prior art, a specific object in the image to be detected can not be determined accurately through post-processing on candidate detection windows determined by using a classifier in the existing object detection method. Moreover, in the case that several specific objects present in the image to be detected overlap partially, the different specific objects overlapping partially with each other can not be distinguished accurately. A post-processing method according to an embodiment of the invention can address these problems by distinguishing effectively detection responses from the different objects in the image to be detected and avoiding mutual interference, thereby determining the proper number and locations of the objects.

The post-processing method according to the embodiment of the invention will be detailed below with reference to FIG. 6A to FIG. 6C. FIG. 6A to FIG. 6C are schematic diagrams illustrating an explanatory example of a process of determining a specific object and the location thereof in an image to be detected through post-processing of combining the detection windows output from the classifiers in the detection step of the object detection method illustrated in FIG. 1.

As illustrated in FIG. 6A, it is assumed that objects 6-1, 6-2 and 6-3 in the image to be detected are to be detected. Particularly, after the detection windows are subjected to classification and comparison using the classifiers, candidate detection windows respectively denoted with broken lines, solid lines and dot-and-dash lines are determined for the objects 6-1, 6-2 and 6-3. In a process of performing classification and detection on the extracted image features of the image to be detected using the classifiers, the respective detection windows are subjected to feature comparison using the corresponding classifiers to derive the probabilities or weights $p\_i$ ($i=1 \ldots N$, N is the total number of detection windows) of all the detection windows located and sized as the specific objects, that is, the probability or weight of a detection window indicates the extent the detection window corresponds to a specific object. The locations and sizes ($x\_i$, $y\_i$, $r\_i$) and the weights $p\_i$ of n detection windows whose $p\_i > T1$ (T1 is a predetermined threshold) among N detection windows are recorded, where n is a natural number less than or equal to N, and $i=1 \ldots n$. The n detection windows are subjected to post-processing to determine the presence and locations of the specific objects in the image to be detected, and therefore can be referred to as "candidate detection windows" to be distinguished from all the detection windows determined from comparison by the classifiers. The weight $p\_i$ is a parameter output from the classifier. If this item is not output from the classifier, then it can be set as "1" by default.

It shall be noted that FIG. 6A illustrates only four candidate detection windows for each object for the sake of clarity, but those skilled in the art would appreciate that this is merely illustrative and the number and locations of the determined candidate detection windows may vary dependent upon the characteristics of the classifiers in use, the features of the image to be detected, etc., and such variations will not have any influence upon the post-processing according to the embodiment of the invention. Moreover, although the following description will be presented in the present embodiment taking detection of the objects 6-1, 6-2 and 6-3 as an example for conciseness, all the specific objects present in the image to be detected of FIG. 6A can be detected through the post-processing according to the embodiment of the invention.

FIG. 6B illustrates allocation of the candidate detection windows illustrated in FIG. 6A to two combination ranges, i.e., an combination range 60-1 corresponding to the objects 6-1 and 6-2 and an combination range 60-2 corresponding to the object 6-3. Since the images in the closely located and similarly sized candidate detection windows among the detection windows whose probabilities or weights are above the predetermined threshold T1 may represent the same object, the process of allocation to a combination range can improve the speed of a subsequent combination process, thereby further improving the efficiency of the combination process and reducing a processing load of the system.

In an explanatory example of the allocation to a combination range, the $i^{th}$ candidate detection window $w\_i$ and $j^{th}$ candidate detection window $w\_j$ satisfying the conditions in the following formula (1) among the candidate detection windows can be allocated to the same combination range as detection windows closely located and similarly sized:

$$|x\_i - x\_j| < difx * r\_i,$$

$$|y\_i - y\_j| < dify * r\_j, \text{ and}$$

$$|\log(r\_i) - \log(r\_j)| < difr \quad (1)$$

where (x_i, y_i) and (x_j, y_j) represent respectively the absolute position coordinates of the centers of the candidate detection windows w_i and w_j in the image to be detected, r_i and r_j represent respectively a ratio of the height or width of the candidate detection windows w_i and w_j relative to a predetermined standard height or width, i.e., a relative size, and i and j are natural numbers larger than or equal to 1 and represent serial numbers of the candidate detection windows and i≦n, j≦n. The size and location of a candidate detection window in the image to be detected can be uniquely determined from the parameters x, y and r. The relative size r can be set to simplify a processing load on the system to thereby achieve optimized processing. Those skilled in the art would appreciate that, it is also possible to perform the foregoing operation directly with the height or width of the detection window. Difx, dify and difr are constants respectively corresponding to the parameters x, y and r of the detection window, and these constants can be set and adjusted appropriately as required for the allocation of the combination ranges. For example, if the size of the detection window is 100*100 pixels, then difx and dify can take a value of 30 or 40 pixels.

It shall be noted that the foregoing allocation of candidate detection windows to a combination range according to such a criterion that the detection windows are closely located and similarly sized is merely illustrative. The allocation to a combination range can be performed according to any other appropriate criterion. For example, the image to be detected is assumed to include a group of adults and a child that is to be positioned and detected. Since the adults significantly differ in size from the child, a candidate detection window with a remarkably smaller size can be determined to constitute a combination range corresponding to the child. Moreover, the foregoing formula (1) for determining close locations and similar sizes are also merely illustrative without limiting the scope of the invention. Any other method for determining whether detection windows are closely located and similarly sized shall be considered as falling into the scope of the invention.

FIG. 6B illustrates a case after the candidate detection windows in FIG. 6A are allocated to the combination ranges. As illustrated in FIG. 6B, the candidate detection windows in FIG. 6A are allocated to the combination range 60-1 and the combination range 60-2. Particularly, the candidate detection windows 6-I (denoted with the dotted lines) corresponding to the object 6-1 and the candidate detection windows 6-II (denoted with the solid lines) corresponding to the object 6-2 are allocated to the same combination range 60-1 and are regarded as closely located and similarly sized candidate detection windows. Alike, the candidate detection windows 6-III (denoted with the dot-and-dash lines) corresponding to the object 6-3 are allocated to the combination range 60-2. Moreover, the candidate detection windows 6-I corresponding to the object 6-1 and the candidate detection windows 6-II corresponding to the object 6-2 are allocated to the same combination range 60-1, as the objects 6-1 and 6-2 in the image to be detected overlap partially. Those skilled in the art would appreciate that the conditions in the foregoing formula (1) can be set appropriately to result in different allocation of the combination ranges. For example, the candidate detection windows 6-I corresponding to the object 6-1 and the candidate detection windows 6-II corresponding to the object 6-2 can also be allocated to two different combination ranges overlapping partially or independent from each other.

After the allocation of the combination ranges, a combination process can be performed on these combination ranges through clustering. Since the processes on the respective combination ranges are similar, the combination process will be detailed below taking one combination range as an example. Specifically, one of a number k (k is a natural number less than or equal to n) of candidate detection windows included the combination range is selected arbitrarily as an initial detection window w_mode for combination. Then, the process searches through other candidate detection windows of the combination range for one candidate detection window, and a similarity difference S between the searched one candidate detection window and the initial detection window w_mode for combination complies with a combination requirement. In this example, the similarity difference S between the detection window for combination and the l-th candidate detection window w_l (l is a natural number less than or equal to k) is defined as in the following formula (2):

$$|S = \left(1 - \frac{2 * |x\_l - x\_mode|}{width\_l + width\_mode}\right) \times \\ \left(1 - \frac{2 * |y\_l - y\_mode|}{height\_l + height\_mode}\right) \times \left(\frac{1}{1 + |\log(r\_l) - \log(r\_mode)|}\right) \quad (2)$$

If the similarity difference S is less than a predetermined threshold T2, then both the detection window w_mode for combination and the detection window w_l are determined to comply with the combination requirement and are subjected to the first round of combination to obtain a combined detection window of the first round.

Parameters of the combined detection window obtained in the forgoing combination process are defined in the following formula (3):

$$(x|\_mode, y\_mode, r\_mode) = \left(\frac{x\_mode * p\_mode + x\_l * p\_l}{p\_mode + p\_l},\right. \\ \left.\frac{y\_mode * p\_mode + y\_l * p\_l}{p\_mode + p\_l}, \frac{r\_mode * p\_mode + r\_l * p\_l}{p\_mode + p\_l}\right) \quad (3)$$

It shall be appreciated that the forgoing formula (2) of calculating the similarity difference S between the candidate detection windows and formula (3) of calculating the parameters of the combined detection window are merely illustrative without limiting the scope of the invention. Any other calculation method capable of achieving the same functions shall be considered as falling into the scope of the invention.

Such a case may be present in the combination process that no candidate detection window which needs to be combined with the detection window for combination can be found after searching all the other candidate detection windows in the combination range, that is, the similarity difference S between any of the other candidate detection windows and the detection window for combination is larger than or equal to the predetermined threshold T2. In this case, any one of the other un-combined candidate detection windows in the combination range is selected as an initial detection window w_mode for combination, and search is made in a similar way as above for one candidate detection window to be combined with the initial detection window w_mode for combination and a first round of combination may be performed.

Next, a combined detection window obtained from the first round of combination is selected as a detection window for combination in a second round of combination, search is made in a similarly way as in the first round of combination for one candidate detection window to be combined with the detection window for combination and the second round of combination is performed.

The foregoing combination process is performed in an iterative way. Particularly, a combined detection window obtained from the last round of combination is taken as a detection window for combination in the present round of combination, search is made through the un-combined candidate detection windows included in the combination range for a candidate detection window to be combined with the detection window for combination according to the similarity difference S between the detection windows and the present round of combination is performed until all the m candidate detection windows in the combination range are combined into one or more detection windows.

Those skilled in the art would appreciate that usually all the candidate detection windows in a combination range correspond to the same specific object, and in this case these candidate detection windows subjected to the foregoing iterative combination process are combined into a combined detection window. However, such a case may also be present that the candidate detection windows in a combination range correspond to more than one specific objects, for example, in the case that the specific objects in the image to be detected overlap partially, the candidate detection windows corresponding to more than one specific objects may be present in a combination range. For example, the combination range 60-1 as illustrated in FIG. 6B includes the candidate detection windows 6-I (denoted by the dotted lines) corresponding to the specific object 6-1 and the candidate detection windows 6-II (denoted by the solid lines) corresponding to the specific object 6-2. In this case, the foregoing iterative combination process finally results in two combined detection windows (not illustrated) respectively corresponding to the objects 6-1 and 6-2.

As can be appreciated, whether there are a plurality of objects present in a combination range also depends upon the foregoing allocation of the combination range. A combination range to which candidate detection windows are allocated may vary depending on different rules for determining whether or not respective candidate detection windows are closely located and similarly sized. For example, candidate detection window corresponding to objects overlapping partially in the image to be detected can be allocated to the same combination range, e.g., the combination range 60-1 as illustrated in FIG. 6B. The different objects included in the same combination range and their locations can be distinguished after performing the foregoing combination process. Related parameters in the combination, e.g., the threshold related to the similarity difference S, can be set so that the different objects in the same combination range can be distinguished precisely. The threshold T2 can be set as required in practice, and details thereof will be omitted here.

Moreover, such a case may also be present that the foregoing combination process is performed on candidate detection windows in a combination range corresponding to a specific object to derive a combined detection window and at least one un-combined detection window. These un-combined detection windows are not combined with the combined detection window because their similarity differences S from the combined detection window are larger or equal to the predetermined threshold T2, and the similarity differences S between these un-combined detection windows are also larger or equal to the predetermined threshold T2 and therefore are not subjected to the combination process. In this case, for example, the weights of the combined detection window and the un-combined detection windows may be compared respectively with a predetermined threshold T3, and one with a weight larger than the threshold T3 is determined to be corresponding to the specific object in the image to be detected. As described above, such a combination process performed in a manner of clustering according to the present embodiment of the invention is of precision sufficient to accommodate required precision of general object detection, that is, the combined detection window in one-to-one correspondence to the specific object in the image to be detected can be obtained. Therefore, the foregoing process of comparing the weights of the detection windows with the predetermined threshold T3 to determine the detection window corresponding to the specific object is actually an optimization process in a specific case, thereby further improving precision of object detection. The predetermined threshold T3 can take a specific value as required in practice, and details thereof will be omitted here.

In the case that a combination range includes candidate detection windows corresponding to more than one specific object, the foregoing combination process can be performed serially or concurrently. "Serially" as mentioned refers to that in the combination process, an initial detection window for combination is selected, and then the foregoing iterative combination process is performed sequentially on the other candidate detection windows in the combination range until combined detection windows corresponding to the respective specific objects are obtained. "Concurrently" as mentioned refers to that different candidate detection windows in the combination range corresponding to the different specific objects are preselected as initial detection windows for combination, and then the combination process is performed concurrently with respect to the different specific objects. The concurrent combination process can achieve a higher combination speed than the serial combination process. The different candidate detection windows corresponding to the different specific objects can be determined in various methods. Generally, candidate detection windows with a smaller similarity (i.e., a larger similarity difference S) are more probable to represent different specific objects, and therefore the similarity can be used as a determination criterion. For example, detection windows in a combination range with the smallest similarity (i.e., the largest similarity difference S) can be determined as candidate detection windows corresponding to different specific objects, and therefore these candidate detection windows can be selected respectively as initial detection windows for the combination associated with the corresponding specific objects to perform the concurrent combination process.

FIG. 6C illustrates a case in the middle of the combination process with respect to respective combination ranges. Particularly, two of the candidate detection windows 6-I corresponding to the object 6-1 with a similarity difference in compliance with a predetermined condition are combined together into a combined detection window, as illustrated with the thick dotted lines 6-I' in FIG. 6C. Alike, two of the candidate detection windows 6-II corresponding to the object 6-2 with a similarity difference in compliance with the predetermined condition are combined together into a combined detection window as illustrated with the thick solid lines 6-II' in FIG. 6C, and two of the candidate detection windows 6-III corresponding to the object 6-3 with a similarity difference in compliance with the predetermined condition are combined together into a combined detection window, as illustrated with the thick dot-and-dashed lines 6-II' in FIG. 6C. For each combination range, the weights p_i (i=1, ..., u) of a number u of candidate detection windows participating the combination among a number k of candidate detection windows in the combination range are combined into a weight of a combined detection window, i.e., the probability P that a specific object is located in the combined detection window, where u is a natural number smaller than or equal to k. As described above, the specific object can be determined as being located in the detection window if P>T3 in an example. Thus, the presence and location of the specific object in the image to be detected can be determined. The weights p_i (i=1, ..., u) of the u candidate detection windows participating the combination can be combined into the weight of the combined detection window through various appropriate combination methods selected or designed by those skilled in the art as required in practice, e.g., a weighted addition method, and therefore repeated descriptions thereof will be omitted here.

In the embodiment as illustrated in FIG. 6A to FIG. 6C, the combination process is performed on the combination range 60-1 and the combination range 60-2 to finally obtain three combined detection windows (not illustrated) respectively corresponding to the objects 6-1, 6-2 and 6-3. These combined detection windows show respectively the presence and specific locations of the objects 6-1, 6-2 and 6-3 in the image to be detected. Of course in an example, the respective weights of these combined detection windows can also be compared respectively with thresholds T3-1, T3-2 and T3-3 related to the objects 6-1, 6-2 and 6-3 to determine that these combined detection windows have their weights larger than respectively the thresholds T3-1, T3-2 and T3-3 and thus represent the objects 6-1, 6-2 and 6-3 in the image to be detected. Those skilled in the art would appreciate that, the predetermined thresholds T3-1, T3-2 and T3-3 can be identical or different from each other dependent upon the characteristics of the objects, etc., and therefore repeated descriptions thereof will be omitted here.

Moreover in the foregoing embodiment described with reference to FIG. 6A to FIG. 6C, allocation of the candidate detection windows to the combination ranges has been performed prior to the combination process of these candidate detection windows. In an alternative, all the candidate detection windows derived in FIG. 6A can be combined directly through the clustering without allocation thereof to any combination range.

Referring again to FIG.6A to FIG.6C as an example, after the n candidate detection windows respectively corresponding to the objects 6-1, 6-2 and 6-3 as illustrated in FIG.6A are obtained, allocation to the combination ranges as illustrated in FIG.6B is not performed but instead these candidate detection windows are directly subjected to a combination process similar to the foregoing iterative combination process with respect to respective combination ranges, that is, all the candidate detection windows are regarded as constituting a large combination range to thereby obtain combined detection windows corresponding respectively to the objects 6-1, 6-2 and 6-3. Only differences of the present alternative from the foregoing embodiment will be described below for conciseness and clarity of the description.

In the iterative combination process in the present alternative, any one of the n candidate detection windows is selected as an initial detection window w_mode for combination, and the similarity difference S between the detection window for combination w_mode and the $m^{th}$ (m is a natural number less than or equal to n) candidate detection window w_m of the other candidate detection windows is defined in the following formulas (4-1) and (4-2):

$$S' = \left(1 - \frac{2*|x\_m - x\_mode|}{width\_m + width\_mode}\right) \times \left(1 - \frac{2*|y\_m - y\_mode|}{height\_m + height\_mode}\right) \times \left(\frac{1}{1 + |\log(r\_m) - \log(r\_mode)|}\right) \quad (4\text{-}1)$$

where the detection window w_mode for combination and the $m^{th}$ candidate detection window w_m satisfy the following relationship:

$$\begin{cases} \left(|x\_m - x\_mode| < \frac{width\_m + width\_mode}{2}, \text{ and} \right. \\ \left. |y\_m - y\_mode| < \frac{height\_m + height\_mode}{2}\right) \\ \left(|x\_m - x\_mode| \rangle = \frac{width\_m + width\_mode}{2}, \text{ or} \right. \\ \left. |y\_m - y\_mode| \rangle = \frac{height\_m + height\_mode}{2}\right) \end{cases} \text{; or} \quad (4\text{-}2)$$

The respective parameters in the formulas (4-1) and (4-2) mean similarly to those in the foregoing embodiment regarding pre-allocation to the combination ranges, and repeated descriptions thereof will be omitted here.

In order to deal with a case that a negative similarity difference S occurs in the combination process, the limitative conditions in the formula (4-2) are set because the negative similarity difference between candidate detection windows will be not appropriate in practice. Other aspects of the present alternative are similar to the foregoing embodiment regarding the pre-allocation to the combination ranges, and repeated descriptions thereof will be omitted here.

It shall be noted that the foregoing process of pre-allocation to the combination ranges actually has an effect of narrowing a combination range in the combination process to be performed subsequently, thereby further reducing a load of and improving the efficiency of the post-processing. Therefore, the foregoing embodiment regarding the pre-allocation to the combination ranges is actually a preferred embodiment over the present alternative.

Figure 7:
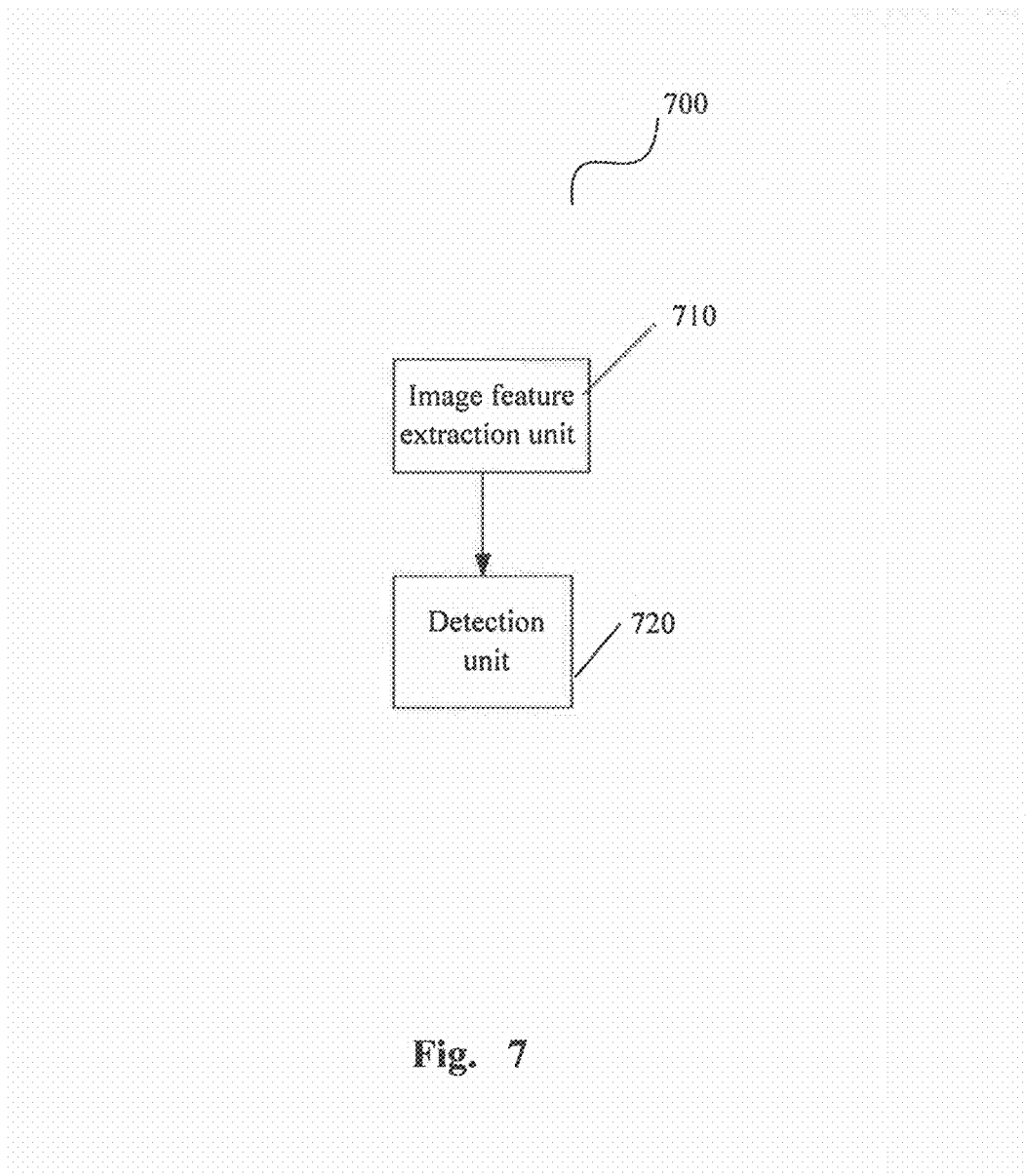
FIG. 7 is a schematic block diagram illustrating a device for detecting a specific object in an image to be detected according to an embodiment of the invention.

A device 700 for detecting a specific object in an image to be detected according to an embodiment of the invention will be described below with reference to FIG. 7. As illustrated in FIG. 7, the object detection device 700 includes: a feature extraction unit 710 configured to extract an image feature of the image to be detected; and a detection unit 720 configured to detect detection windows with various sizes of the image to be detected according to the extracted image feature by using classifiers with various sizes corresponding to at least a part of the detection windows with various sizes, so as to determine the presence and location of a specific object in the image to be detected.

In an explanatory example of the object detection device illustrated in FIG. 7, the device can further include a unit adapted to perform a transformation on a classifier with a specific size among the classifiers with various sizes to obtain a classifier with a different size from the sizes of the classifiers with various sizes.

In another explanatory example of the object detection device illustrated in FIG. 7, the feature extraction unit 710 includes a set-of-image-features creation sub-unit configured to pre-generate a set of image features of the image to be detected, so that at least a part of image features of the detection windows with various sizes can be retrieved from the set of image features.

The foregoing feature extraction unit 710, detection unit 720, the unit fro transforming the classifier and the set-of-image-features creation sub-unit illustrated in FIG. 7 can be configured to perform the foregoing method for detecting a specific object in an image to be detected illustrated in FIG. 1 to FIG. 6. Such configurations can be implemented in hardware, software or a combination thereof, and repeated descriptions thereof will be omitted here.

Correspondingly, an object detection system including the device for detecting a specific object in an image to be detected as illustrated in FIG. 7 shall also be considered as falling into the scope of the invention, and the system can perform the foregoing method for detecting a specific object in an image to be detected illustrated in FIG. 1 to FIG. 6.

It shall be noted that the foregoing embodiments have been described taking HOG features as an example and the object to be detected is a human being. However, those skilled in the art would appreciate that the foregoing method, device and system for detecting an object in an image to be detected according to the respective embodiments of the invention can also be applicable to object detection based upon any other appropriate type of image feature, e.g., a Harr feature. Of course, since parameters of respective image features and extraction methods thereof, a specific implementation of classification and determination by a classifier, etc., may vary depending on different applications, the forms of the set of image features, a calculation process for creating the set of image features, a detection process of the classifier, etc., will also vary accordingly. However, these variations are not essential to the invention and those skilled in the art can readily implement applications in various scenarios in view of the above described configurations of the respective embodiments, and therefore repeated descriptions thereof will be omitted here.

The method and device for detecting an object in an image and the system including the object detection device according to the embodiments of the invention can be applicable to target identification in the fields of, for example, video surveillance, artificial intelligence, computer vision, in such a way that they can be used to detect the presence and location of an object as an identification target in a static image or dynamic video images.

The description and drawings have disclosed in details the embodiments of the invention and pointed out the ways in which the principal of the invention can be adopted. It shall be appreciated that the scope of the invention will not be limited thereto. The invention is intended to encompass numerous variations, modifications and equivalents without departing from the spirit and scope of the invention.

The embodiments of the invention have been described above in detail, and it shall be noted that a feature described and/or illustrated in an embodiment can be used equally or similarly in one or more other embodiments, in combination with or in place of features of the other embodiments.

It shall be emphasized that the term "include/comprise" and variants thereof as used in the specification refer to the presence of a feature, element, step or component, but will not preclude the presence or addition of one or more other features, elements, steps or components.

Moreover, the method disclosed in the foregoing embodiments of the invention will not be limited to being performed in the sequence described in the specification but can alternatively be performed in any other sequence, concurrently or independently. Therefore, the scope of the invention will not be limited to the sequence of performing the method described in the specification.

The indefinite article "a/an" preceding an element will not prelude the presence of a plurality of such elements. "Include/comprise", "consisted of" and variants thereof will not preclude the presence of one or more other elements than a listed element(s).

The invention further proposes a machine readable program which when being installed and run on a machine, e.g., an image recognition and detection device, can perform the object detection method disclosed in the foregoing embodiments of the invention.

A storage medium carrying the foregoing machine readable program shall also be encompassed in the disclosure of the invention. The store medium includes but will not be Limited t a floppy disk, an optical disk, a magnetic optical disk, a memory card, a memory stick, etc.

Although the invention has been disclosed above in the description of the embodiments of the invention, it shall be appreciated that those skilled in the art can devise various modifications, adaptations or equivalents of the invention without departing from the spirit and scope of the appended claims. These modifications, adaptations or equivalents shall also be considered as falling into the scope of the invention.

The invention claimed is:

1. A method for detecting a specific object in an image to be detected, comprising:
   a feature extraction step for extracting an image feature of the image to be detected;
   a detection step for detecting detection windows with various sizes of the image to be detected according to the extracted image feature by using classifiers with various sizes corresponding to at least a part of the detection windows with various sizes, so as to determine the presence and location of a specific object in the image to be detected; and
   performing a transformation on a classifier with a specific size among the classifiers with various sizes to obtain a classifier with a different size from the sizes of the classifiers with various sizes,
   wherein the transformation comprises doubling or segmentation.

2. The method according to claim 1, wherein each of the classifiers with various sizes is provided with a library of sample images corresponding to its size.

3. The method according to claim 1, wherein image features of at least a part of all cells of the image to be detected related to the detection windows with various sizes are pre-generated in the feature extraction step to thereby create a set of image features of the image to be detected, so that at least a part of image features of the detection windows with various sizes can be retrieved from the set of image features, and wherein the set of image features comprises values of the image features of the at least a part of cells and the locations of these cells throughout the image to be detected.

4. The method according to claim 3, wherein the at least a part of cells comprise basic cells with at least one specific size throughout the image to be detected, and the process of creating the set of image features of the image to be detected comprises:
   deriving the image features of the basic cells, and deriving the image features of the cells larger in size than the basic cells among the at least a part of cells based on the derived image features of the basic cells to thereby create the set of image features of the image to be detected.

5. The method according to claim 4, wherein the set of image features is created by:
   performing simple addition on the image features of the basic cells for at least one time to derive the image features of the cells whose sizes are any integer multiple of the size of the basic cells; and/or performing iterative addition on the image features of the basic cells for several times to derive the image features of the cells whose sizes are any integer multiple of the size of the basic cells.

6. The method according to claim 5, wherein the process of performing iterative addition for several times comprises:

performing simple addition on the image features of the basic cells to derive the image features of a first group of cells larger in size than the basic cells, performing simple addition on the image features of the first group of cells to derive the image features of a second group of cells larger in size than the first group of cells, and continuing with the iterative addition in this way to thereby derive the image features of the cells whose sizes are any integer multiple of the size of the basic cells.

7. The method according to claim 1, wherein the process of determining the presence and location of the specific object in the image to be detected in the detection step comprises:

performing a combination process by clustering on a number n of candidate detection windows with weights larger than a predetermined first threshold T1 among all the detection windows with various sizes to obtain at least one combined detection window, wherein the n number of candidate detection windows are determined by detecting the detection windows with various sizes of the image to be detected according to the extracted image features, and wherein n is a natural number larger than or equal to 1.

8. The method according to claim 7, wherein the process of performing a clustering process on the n candidate detection windows comprises:

taking any one of the n candidate detection windows as an initial detection window $w_{13}$ mode for combination, selecting from all the other candidate detection windows comprised among the n candidate detection windows a $m^{th}$ candidate detection window w_m with a similarity difference from the initial detection window for combination less than a predetermined second threshold T2, and performing the first round of combination on the candidate detection window $w_{13}$ m and the detection window $w_{13}$ mode for combination to obtain a combined detection window of the first round, wherein m is a natural number less than or equal to n;

performing the combination in an iterative way until the obtained combined detection window can not be combined with any of the un-combined candidate detection windows among the n candidate detection windows to thereby obtain a combined detection window, wherein the combined detection window obtained from the last round of combination is taken as the detection window for combination in the present round of combination, and the present round of combination is performed on the detection window for combination and one of the un-combined candidate detection windows among the n candidate detection windows with a similarity difference from the detection window for combination less than the predetermined threshold T2 to obtain the combined detection window of the present round; and if un-combined candidate detection windows are present among the n candidate detection windows, then taking the respective un-combined candidate detection windows as an initial detection window for combination and performing the combination in said iterative way, thereby obtaining at least one combined detection window.

9. The method according to claim 8, wherein the similarity difference S between the detection window w_mode for combination and the $m^{th}$ candidate detection window w_m is calculated in the following formula:

$$S = \left(1 - \frac{2*|\text{x\_m} - \text{x\_mode}|}{\text{width\_m} + \text{width\_mode}}\right) \times$$
$$\left(1 - \frac{2*|\text{y\_m} - \text{y\_mode}|}{\text{height\_m} + \text{height\_mode}}\right) \times \left(\frac{1}{1 + |\log(\text{r\_m}) - \log(\text{r\_mode})|}\right)$$

wherein the detection window w_mode for combination and the $m^{th}$ candidate detection window w_m satisify the following relationship:

$$\begin{cases} \left(|\text{x\_m} - \text{x\_mode}| < \frac{\text{width\_m} + \text{width\_mode}}{2}, \text{ and} \right. \\ \left. |\text{y\_m} - \text{y\_mode}| < \frac{\text{height\_m} + \text{height\_mode}}{2}\right) \\ \left(|\text{x\_m} - \text{x\_mode}|\rangle = \frac{\text{width\_m} + \text{width\_mode}}{2}, \text{ or} \right. \\ \left. |\text{y\_m} - \text{y\_mode}|\rangle = \frac{\text{height\_m} + \text{height\_mode}}{2}\right) \end{cases} ; \text{or}$$

wherein (x_mode, y_mode) represents the absolute position coordinates of the center of the detection window for combination w_mode in the image to be detected, r_mode represents a ratio of the height or width of the detection window for combination w_mode relative to a predetermined standard height or width, height_mode and width_mode represent respectively the height and width of the detection window for combiantion w_mode, (x_m, y_m) represents the absolute position coordinates of the center of the candidate detection window w_m in the image to be detected, r_m represents a ratio of the height or width of the candidate detection window w_m relative to the standard height or width, and height_mode and width_mode represent respectively the height and width of the candidate detection window w_m.

10. The method according to claim 9, wherein parameters of the combined detection window obtained by combining the detection window for combination w_mode and the $m^{th}$ candidate detection window w_m are calculated in the following formula:

$$(\text{x\_mode}, \text{y\_mode}, \text{r\_mode}) = \left(\frac{\text{x\_mode}*\text{p\_mode} + \text{x\_m}*\text{p\_m}}{\text{p\_mode} + \text{p\_m}},\right.$$
$$\left.\frac{\text{y\_mode}*\text{p\_mode} + \text{y\_m}*\text{p\_m}}{\text{p\_mode} + \text{p\_m}}, \frac{\text{r\_mode}*\text{p\_mode} + \text{r\_m}*\text{p\_m}}{\text{p\_mode} + \text{p\_m}}\right)$$

where x_mode, y_mode and r_mode at the left side of the formula represent the parameters of the combined detection window obtained from the combination, x_mode, y_mode and r_mode at the right side of the formula represent the parameters of the detection window for combination, p_mode and p_m represent respectively the weights of the detection window for combination w_mode and the $m^{th}$ candidate detection window w_m.

11. The method according to claim 8, wherein the process of performing a clustering process on the n candidate detection windows comprises:

allocating closely located and similarly sized detection windows among the n candidate detection windows to at least one combination range, and performing combination with respect to each of the combination range to obtain at least one combined detection window, wherein the $i^{th}$ candidate detection window w_i and the $j^{th}$ candidate detection window w_j satisfying the following conditions are allocated as the closely located and similarly sized candidate detection windows to the same combination range:

$|x\_i - x\_j| < difx * r\_i$, $|y\_i - y\_j| < dify * r\_j$, and $|\log(r\_i) - \log(r\_j)| < difr$ wherein (x_i, y_i) and (x_j, y_j) represent respectively the absolute position coordinates of the centers of the candidate detection windows w_i and w_j in the image to be detected, r_i and r_j represent respectively a ratio of the height or width of the candidate detection windows w_i and w_j relative to a predetermined standard height or width, difx, dify and difr represent respectively constants related to x, y and r, and i and j are natural numbers larger than or equal to 1 and i≦n, j≦n; and wherein during the combination process with respect to each of the combination range, the similarity difference S between the detection window w_mode for combination and the l-th candidate detection window w_l is calculated by the following formula in any of the at least one combination range:

$$S = \left(1 - \frac{2*|x\_l - x\_mode|}{width\_l + width\_mode}\right) \times \left(1 - \frac{2*|y\_l - y\_mode|}{height\_l + height\_mode}\right) \times \left(\frac{1}{1 + |\log(r\_l) - \log(r\_mode)|}\right)$$

wherein (x_l, y_l) represents the absolute position coordinates of the center of the candidate detection window w_l in the image to be detected, r_l represents a ratio of the height or width of the candidate detection window w_l relative to the standard height or width, height_l and width_l represent respectively the height and width of the candidate detection window w_l, and l is a natural number less than or equal to n.

12. A device for detecting a specific object in an image to be detected, comprising:

a feature extraction unit configured to extract an image feature of the image to be detected;

a detection unit configured to detect detection windows with various sizes of the image to be detected according to the extracted image feature by using classifiers with various sizes corresponding to at least a part of the detection windows with various sizes, so as to determine the presence and location of a specific object in the image to be detected; and a unit adapted to perform a transformation on a classifier with a specific size among the classifiers with various sizes to obtain a classifier with a different size from the sizes of the classifiers with various sizes, wherein the transformation comprises doubling or segmentation.

13. The device according to claim 12, wherein each of the classifiers with various sizes is provided with a library of sample images corresponding to its size.

14. The device according to claim 12, wherein the feature extraction unit comprises a set-of-image-features creation sub-unit configured to pre-generate image features of at least a part of all cells of the image to be detected related to the detection windows with various sizes to thereby create a set of image features of the image to be detected, so that at least a part of image features of the detection windows with various sizes can be retrieved from the set of image features, and wherein the set of image features comprises values of the image features of the at least a part of cells and the locations of these cells throughout the image to be detected.

15. The device according to claim 14, wherein the at least a part of cells comprise basic cells with at least one specific size throughout the image to be detected, and the set-of-image-features creation sub-unit is configured to:

derive the image features of the basic cells, and derive the image features of the cells larger in size than the basic cells among the at least a part of cells based on the derived image features of the basic cells to thereby create the set of image features of the image to be detected.

16. The device according to claim 15, wherein the set-of-image-features creation sub-unit is configured to create the set of image features by:

performing simple addition on the image features of the basic cells for at least one time to derive the image features of the cells whose sizes are any integer multiple of the size of the basic cells; and/or performing iterative addition on the image features of the basic cells for several times to derive the image features of the cells whose sizes are any integer multiple of the size of the basic cells.

17. The device according to claim 16, wherein the set-of-image-features creation sub-unit is configured to perform iterative addition for several times by:

performing simple addition on the image features of the basic cells to derive the image features of a first group of cells larger in size than the basic cells, performing simple addition on the image features of the first group of cells to derive the image features of a second group of cells larger in size than the first group of cells, and continuing with the iterative addition in this way to thereby derive the image features of the cells whose sizes are any integer multiple of the size of the basic cells.

18. The device according to claim 12, wherein the detection unit is configured to:

perform a combination process by clustering on a number n of candidate detection windows with weights larger than a predetermined first threshold T1 among all the detection windows with various sizes to obtain at least one combined detection window, wherein the n number of candidate detection windows are determined by detecting the detection windows with various sizes of the image to be detected according to the extracted image features, and wherein n is a natural number larger than or equal to 1.

19. An object detection system comprising the device for detecting a specific object in an image to be detected according to claim 12, wherein the object detection system is a video surveillance system, an artificial intelligence system or a computer vision system.

20. A non-transitory machine readable storage medium storing a program comprising machine readable instruction codes stored therein, wherein the instruction codes, when read and executed by the machine, are capable of causing the machine to execute the method according to claim 1.

21. A method for detecting a specific object in an image to be detected, comprising:

a feature extraction step for extracting an image feature of the image to be detected; and a detection step for detecting detection windows with various sizes of the image to be detected according to the extracted image feature by using classifiers with various sizes corresponding to at least a part of the detection windows with various sizes, so as to determine the presence and location of a specific object in the image to be detected, wherein the process of determining the presence and location of the specific object in the image to be detected in the detection step comprises:

performing a combination process by clustering on a number n of candidate detection windows with weights larger than a predetermined first threshold T1 among all the detection windows with various sizes to obtain at least one combined detection window, wherein the n number of candidate detection windows are determined by detecting the detection windows with various sizes of the image to be detected according to the extracted image features, and wherein n is a natural number larger than or equal to 1.

22. The method according to claim 21, wherein the process of performing a clustering process on the n candidate detection windows comprises:

taking any one of the n candidate detection windows as an initial detection window w_mode for combination, selecting from all the other candidate detection windows comprised among the n candidate detection windows a $m^{th}$ candidate detection window w_with a similarity difference from the initial detection window for combination less than a predetermined second threshold T2, and performing the first round of combination on the candidate detection window w_m and the detection window w_mode for combination to obtain a combined detection window of the first round, wherein m is a natural number less than or equal to n;

performing the combination in an iterative way until the obtained combined detection window can not be combined with any of the un-combined candidate detection windows among the n candidate detection windows to thereby obtain a combined detection window, wherein the combined detection window obtained from the last round of combination is taken as the detection window for combination in the present round of combination, and the present round of combination is performed on the detection window for combination and one of the un-combined candidate detection windows among the n candidate detection windows with a similarity difference from the detection window for combination less than the predetermined threshold T2 to obtain the combined detection window of the present round; and if un-combined candidate detection windows are present among the n candidate detection windows, then taking the respective un-combined candidate detection windows as an initial detection window for combination and performing the combination in said iterative way, thereby obtaining at least one combined detection window.

23. The method according to claim 22, wherein the similarity difference S between the detection window w_mode for combination and the $m^{th}$ candidate detection window w_m is calculated in the following formula:

$$S = \left(1 - \frac{2*|x\_m - x\_mode|}{width\_m + width\_mode}\right) \times \left(1 - \frac{2*|y\_m - y\_mode|}{height\_m + height\_mode}\right) \times \left(\frac{1}{1 + |\log(r\_m) - \log(r\_mode)|}\right)$$

wherein the detection window w mode for combination and the $m^{th}$ candidate detection window w_m satisify the following relationship:

$$\begin{cases} \left(|x\_m - x\_mode| < \frac{width\_m + width\_mode}{2}, \text{ and} \\ |y\_m - y\_mode| < \frac{height\_m + height\_mode}{2}\right) \\ \left(|x\_m - x\_mode| \rangle = \frac{width\_m + width\_mode}{2}, \text{ or} \\ |y\_m - y\_mode| \rangle = \frac{height\_m + height\_mode}{2}\right) \end{cases} ; \text{ or}$$

wherein (x_mode, y_mode) represents the absolute position coordinates of the center of the detection window for combination w_mode in the image to be detected, r_mode represents a ratio of the height or width of the detection window for combination w_mode relative to a predetermined standard height or width, height_mode and width_mode represent respectively the height and width of the detection window for combiantion w_mode, (x_m, y_m) represents the absolute position coordinates of the center of the candidate detection window w_m in the image to be detected, r_m represents a ratio of the height or width of the candidate detection window w m relative to the standard height or width, and height_mode and width_mode represent respectively the height and width of the candidate detection window w_m.

24. The method according to claim 23, wherein parameters of the combined detection window obtained by combining the detection window for combination w_mode and the $m^{th}$ candidate detection window w_m are calculated in the following formula:

$$(x\_mode, y\_mode, r\_mode) = \left(\frac{x\_mode*p\_mode + x\_m*p\_m}{p\_mode + p\_m}, \frac{y\_mode*p\_mode + y\_m*p\_m}{p\_mode + p\_m}, \frac{r\_mode*p\_mode + r\_m*p\_m}{p\_mode + p\_m}\right)$$

where x_mode, y_mode and r_mode at the left side of the formula represent the parameters of the combined detection window obtained from the combination, x_mode, y_mode and r_mode at the right side of the formula represent the parameters of the detection window for combination, p_mode and p_m represent respectively the weights of the detection window for combination w_mode and the $m^{th}$ candidate detection window w_m.

25. The method according to claim 22, wherein the process of performing a clustering process on the n candidate detection windows comprises:

allocating closely located and similarly sized detection windows among the n candidate detection windows to at least one combination range, and performing combination with respect to each of the combination range to obtain at least one combined detection window, wherein the i$^{th}$ candidate detection window w_i and the j$^{th}$ candidate detection window w_j satisfying the following conditions are allocated as the closely located and similarly sized candidate detection windows to the same combination range:

$|x\_i - x\_j| < difx * r\_i$, $|y\_i - y\_j| < dify * r\_j$, and $|\log(r\_i) - \log(r\_j)| < difr$ wherein (x_i, y_i) and (x_j, y_j) represent respectively the absolute position coordinates of the centers of the candidate detection windows w_i and w_j in the image to be detected, r_i and r_j represent respectively a ratio of the height or width of the candidate detection windows w_i and w_j relative to a predetermined standard height or width, difx, dify and difr represent respectively constants related to x, y and r, and i and j are natural numbers larger than or equal to 1 and i≦n, j≦n; and wherein during the combination process with respect to each of the combination range, the similarity difference S between the detection window w mode for combination and the l-th candidate detection window w_1 is calculated by the following formula in any of the at least one combination range:

$$S = \left(1 - \frac{2 * |x\_l - x\_mode|}{width\_l + width\_mode}\right) \times \left(1 - \frac{2 * |y\_l - y\_mode|}{height\_l + height\_mode}\right) \times \left(\frac{1}{1 + |\log(r\_l) - \log(r\_mode)|}\right)$$

wherein (x_1, y_1) represents the absolute position coordinates of the center of the candidate detection window w_1 in the image to be detected, r_1 represents a ratio of the height or width of the candidate detection window w_1 relative to the standard height or width, height_1 and width_1 represent respectively the height and width of the candidate detection window w_1, and 1 is a natural number less than or equal to n.

\* \* \* \* \*